US005635902A

United States Patent [19]
Hochstein

[11] Patent Number: 5,635,902
[45] Date of Patent: Jun. 3, 1997

[54] L.E.D. ENHANCED BUS STOP SIGN

[76] Inventor: Peter A. Hochstein, 2966 River Valley Dr., Troy, Mich. 48098

[21] Appl. No.: 340,716

[22] Filed: Nov. 16, 1994

[51] Int. Cl.$^6$ ................................................. B60Q 1/26
[52] U.S. Cl. ........................ 340/433; 340/471; 340/472; 340/473; 340/332; 340/815.45
[58] Field of Search ........................ 340/471, 472, 340/473, 433; 362/80.1, 800

[56] References Cited

U.S. PATENT DOCUMENTS

| | | | |
|---|---|---|---|
| 4,271,408 | 6/1981 | Teshima et al. | 340/815.75 |
| 4,456,126 | 6/1984 | Hicks, Jr. | 206/513 |
| 4,559,518 | 12/1985 | Latta, Jr. | 340/433 |
| 4,682,147 | 7/1987 | Bowman | 340/433 |
| 4,816,804 | 3/1989 | Reavell | 340/433 |
| 4,825,192 | 4/1989 | Wells | 340/433 |
| 4,951,179 | 8/1990 | Machida | 340/433 |
| 5,036,248 | 7/1991 | McEwan et al. | 340/433 |
| 5,036,307 | 7/1991 | Reavell et al. | 340/433 |
| 5,132,662 | 7/1992 | Burch | 340/433 |
| 5,132,666 | 7/1992 | Fahs | 340/468 |
| 5,136,287 | 8/1992 | Borenstein | 340/925 |
| 5,175,528 | 12/1992 | Choi et al. | 340/331 |
| 5,281,948 | 1/1994 | Estrada | 340/433 |
| 5,313,188 | 5/1994 | Choi et al. | 340/331 |
| 5,426,414 | 6/1995 | Flatin et al. | 340/472 |
| 5,500,638 | 3/1996 | George | 340/468 |

*Primary Examiner*—Jeffery Hofsass
*Assistant Examiner*—Daryl Pope
*Attorney, Agent, or Firm*—Howard & Howard

[57] ABSTRACT

A school bus stop sign (10) of the type rotatably coupled to a school bus (18) and movable between a retracted position adjacent to the school bus (18) and an extended position extending outwardly from the school bus (18) is disclosed. The bus stop sign (10) is characterized by an array of light emitting diodes (34) disposed on the bus stop sign (10) to provide illumination thereto.

6 Claims, 3 Drawing Sheets

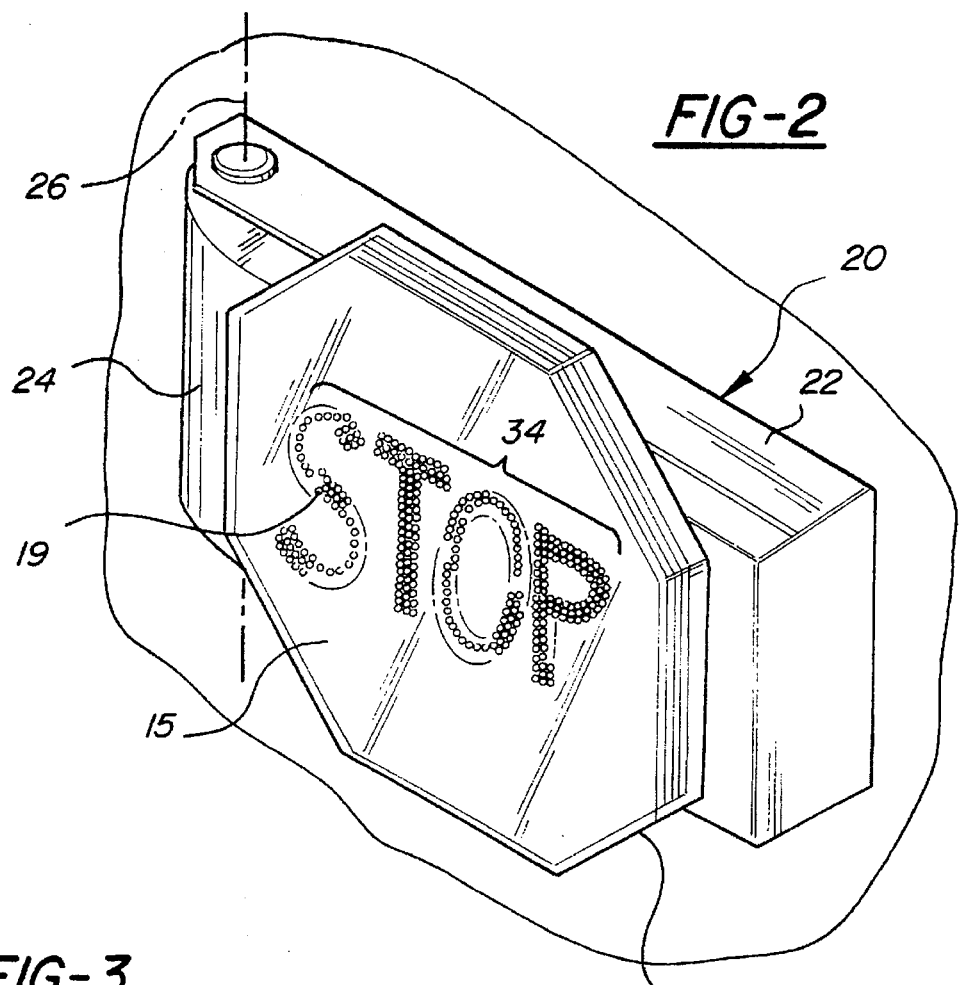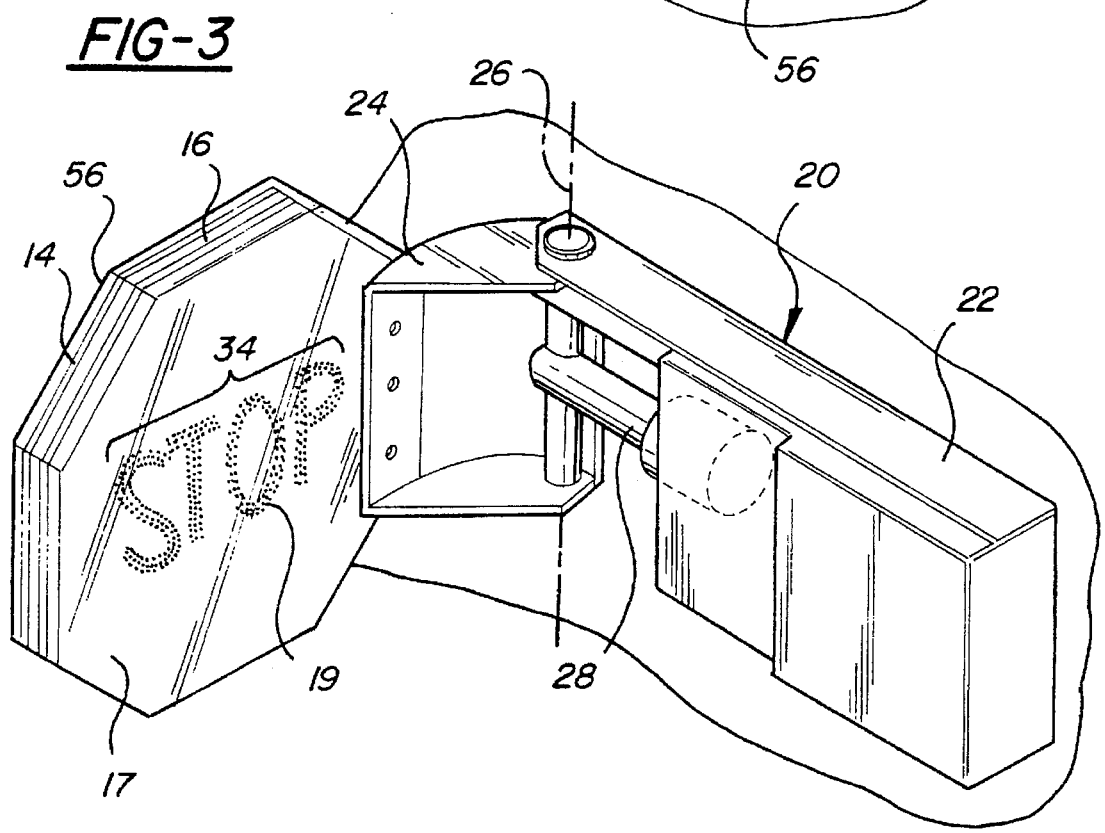

L.E.D. ENHANCED BUS STOP SIGN

TECHNICAL FIELD

The subject invention relates to safety units, such as crossing gates and stop signs, of the type mounted to a school bus and movable between a retracted position adjacent to the school bus and an extended position extending outwardly from the school bus.

BACKGROUND OF THE INVENTION

For many years school buses have been equipped with safety units, such as crossing gates and stop signs, rotatably mounted to the school bus and movable between a retracted position adjacent to the body of the bus and an extended position extending outwardly from the body of the bus. A stop sign safety unit alerts drivers of nearby vehicles that children are either entering or exiting the school bus whereas a crossing gate safety unit forces children to walk at a safe distance from the front of the bus such that the school bus driver can see the children free from the obstruction created by the bus body. U.S. Ser. No. 08/061,722 filed May 17, 1993, of common assignee herewith, provides an example of school bus stop signs and crossing gates.

In U.S. Pat. No. 5,036,307 to Reavell et al. a school bus stop sign safety unit comprising a conventional octagonal plate having indicia defining the word STOP is disclosed. The stop sign includes a pair of flasher lights which are caused to flash periodically to provide a highly visible warning to the drivers of nearby vehicles. The circuitry which causes the flashers to flash is conventionally located in a remote location from the stop sign, usually within the school bus body or the housing which mounts the stop sign to the school bus. The flashers on the school bus stop sign use incandescent light bulbs. Incandescent light bulbs are cumbersome and bulky and have a tendency of burning out thereby requiring frequent replacement. It would be an improvement over the prior art school bus safety units to illuminate the safety units using light emitting diodes (L.E.D.'s) rather than incandescent light bulbs. L.E.D.'s have a much longer life than conventional incandescent bulbs and thus would substantially reduce maintenance cost and safety problems created by incandescent bulbs. Additionally, L.E.D.'s are encapsulated in a durable compact transparent plastic package resistant to the harsh operating environment of a school bus.

SUMMARY OF THE INVENTION AND ADVANTAGES

The invention comprises in combination with a vehicle, a safety unit mounted on the vehicle and movable between a retracted position adjacent to the vehicle and an extended position extending outwardly from the vehicle. The safety unit of the invention is characterized by an array of light emitting diodes disposed on the safety unit for providing illumination.

The present invention provides the advantage of a highly visible safety unit, such as a stop sign or crossing gate, for a school bus which requires infrequent maintenance.

The present invention also provides the advantage of replacing incandescent lamps with light emitting diodes.

The present invention also provides the advantage of a flashing or pulsing circuit that is mounted directly to the safety unit and an integral part thereof.

FIGURES IN THE DRAWINGS

Other advantages of the present invention will be readily appreciated as the same becomes better understood by reference to the following detailed description when considered in connection with the accompanying drawings wherein:

FIG. 2 is a perspective view of the present invention shown in its retracted position;

FIG. 3 is a perspective view of the subject invention shown in its fully extended position;

DESCRIPTION OF THE PREFERRED EMBODIMENT

Figure 1:
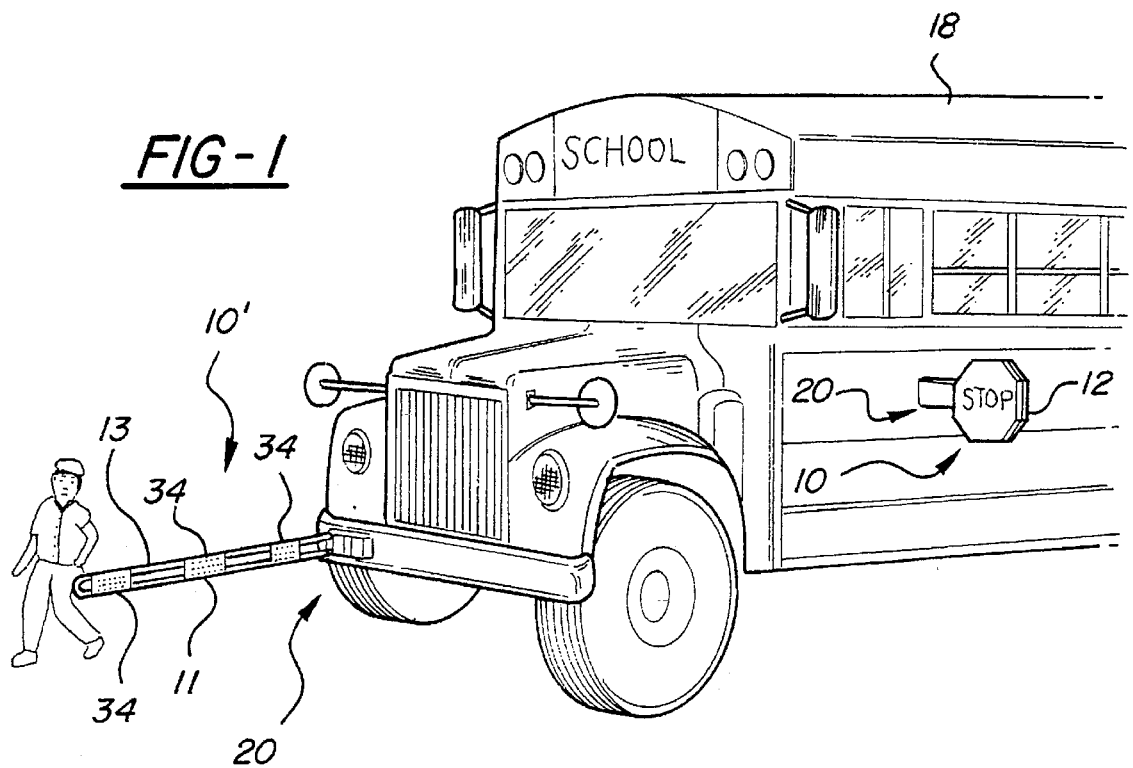
FIG. 1 is a perspective view of a school bus showing the subject invention movably mounted thereto.

Referring to the Figures wherein like numerals indicate like or corresponding parts throughout the several views, the safety unit of the present invention is generally shown at 10, 10'.

Safety unit 10, 10' is mounted to a school bus 18 of the type comprising a passenger compartment having a front end and a rear end, a plurality of seats disposed within the passenger compartment between the front and rear ends, and an isle extending from the front end to the rear end for allowing a passenger to walk from the front end to the rear end to access the seats. The safety unit 10, 10' is movable between a retracted position adjacent to the school bus 18 and an extended position extending outwardly from the school bus 18. In other words, safety unit 10, 10' is rotatably mounted to the school bus 18. FIG. 2 shows the safety unit 10 in the retracted position, while FIG. 3 shows the safety unit 10 in the extended position.

Safety unit 10 comprises an indicator or semaphore. Safety unit 10 preferably comprises display sign means 12 for displaying a message. Display sign means 12 preferably includes a first planar plate 14 and a second planar plate 16 parallel to the first plate 14. However, it will be appreciated that display sign means 12 could comprise of any equivalent structure capable of warning or displaying a visual message to other drivers. First and second plates 14, 16 are preferably of the same shape and size and are mounted to each other such that the respective perimeters thereof are aligned. Plates 14, 16 preferably have an octagonal shape similar to that of a conventional stop sign and include a front surface 15 and a rear surface 17. Plates 14, 16 include a message indicia 19 disposed on the front and rear surfaces 15, 17. Preferably, the message indicia 19 defines the word STOP.

Safety unit 10' comprises a crossing gate 11 having at least one solid bar 13. Each solid bar 13 has a length shorter than width of the bus 18.

From the retracted position, the safety unit 10 extends out from the side of the bus 18 to the extended position to alert traffic to stop when the bus 18 is stopped. Likewise, the crossing gate 11 swings out away from the front of the bus 18 to the extended position to effect a barrier to prevent children from walking directly in front of the bus 18 where the bus driver cannot see. Preferably, the crossing gate 11 and plates 14, 16 are perpendicular to the front and side of the bus 18, respectively, when the safety unit 10, 10' is in the extended position.

Safety unit 10, 10' further includes actuating means 20 for movably mounting the safety unit 10, 10' to the bus 18 and for moving the safety unit 10, 10' between the retracted and extended positions. Actuating means 20 comprises a housing 22 fixedly mounted to the school bus 18. With safety unit 10, the housing 22 is fixedly mounted to the side of the school bus 18 whereas with safety unit 10', the housing 22 is fixedly mounted to the front or rear of the school bus 18. Actuating means 20 further comprises bracket means 24 for pivotally mounting the safety unit 10, 10' to the housing 22 for movement about a predetermined pivot axis 26. Actuating means 20 further includes drive means 28 for pivoting the bracket means 24 about pivot axis 26 between the retracted and extended positions. Actuating means 20 can include but is not limited to those described and disclosed in U.S. Pat. No. 5,036,307, the teachings of which are incorporated herein by reference or of U.S. Ser. No. 08/061,722, of common assignee herewith and the teachings of which are also incorporated herein by reference.

Figure 4:
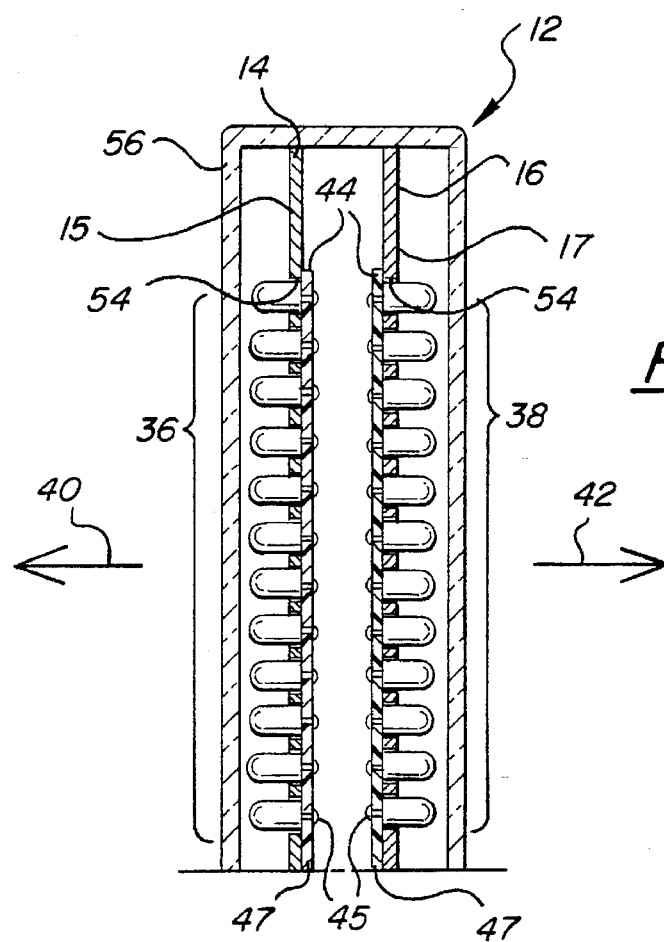
FIG. 4 is a side view of the present invention.

Referring to FIGS. 2–4, the safety unit 10, 10' is characterized by an array of light emitting diodes 34 disposed on the safety unit 10, 10' for providing illumination thereto. With the embodiment of safety unit 10, the array 34 comprises a first set of light emitting diodes 36 disposed on the front surface 15 for providing illumination in a first direction 40 and a second set of light emitting diodes 38 disposed on the rear surface 17 for providing illumination in a second direction 42. Thus, in such a manner drivers of vehicles heading in the same direction as the school bus 18 will visually see the second set of light emitting diodes 38 when the display sign means 12 is in the fully extended position. On the other hand, drivers of vehicles heading in a direction opposite to the school bus 18 will visually see the illumination cast by the first set of light emitting diodes 36 when the display sign means 12 is in the fully extended position. In other words, first and second sets of light emitting diodes 36, 38 cast illumination in different and opposite directions 40, 42.

Figure 5:
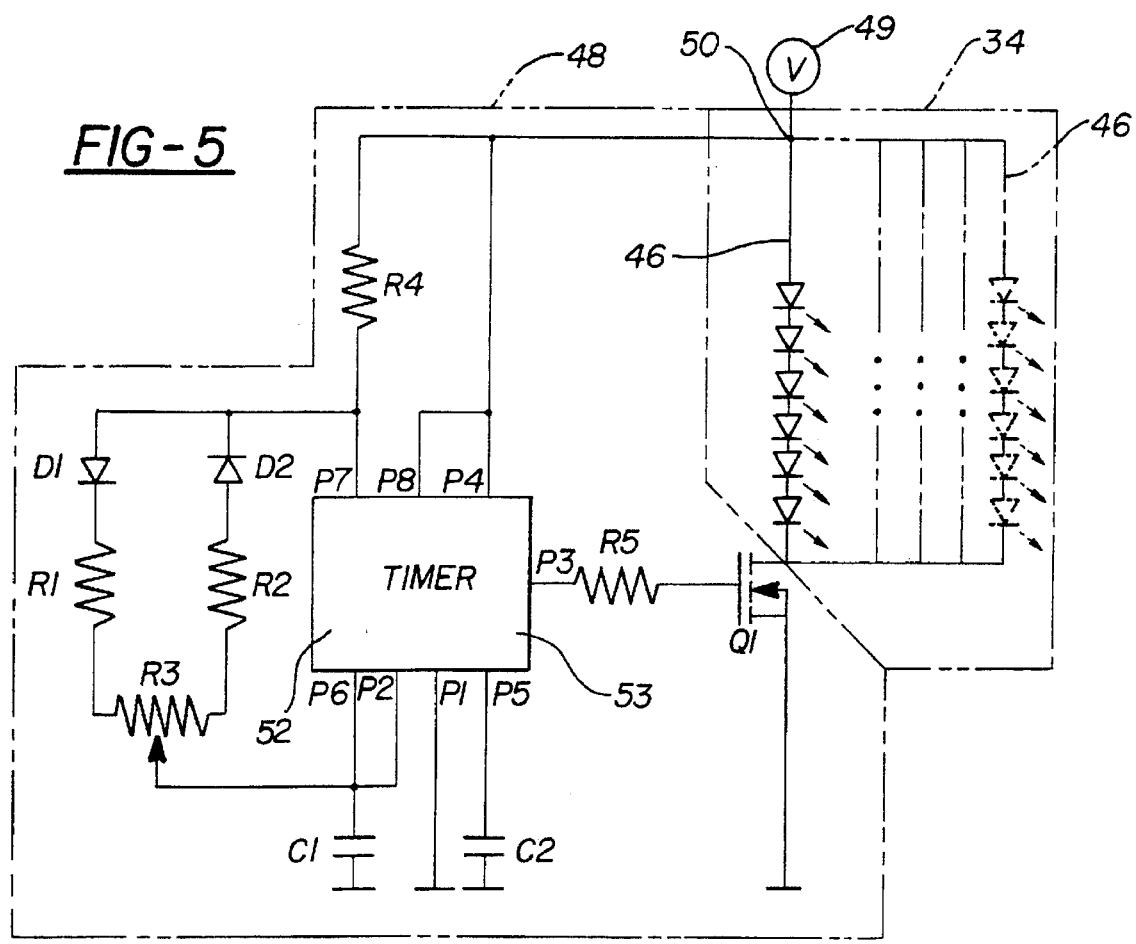
FIG. 5 is a schematic diagram of the pulsating power circuit of the present invention.

As can best be seen in FIG. 4, safety unit 10, 10' further includes at least one circuit board means 44 mounted to the safety unit 10, 10' for electrically coupling the array of light emitting diodes 34 in a plurality of series circuits 46 and for electrically coupling the series circuits 46 in parallel, as schematically depicted in FIG. 5. Circuit board means 44 comprises at least one printed circuit board (PCB) 47 having connection means or embedded conductors 45 which electrically couple the series circuits 46 in parallel. Since the light emitting diodes 34 are connected in parallel, a single defective or burnt-out light emitting diode in any one of the series circuits 46 will not effect the operation of the other series circuits 46. The array of light emitting diodes 34 can be used to simply highlight the safety unit 10, 10'. However, with the safety unit 10, the first set of light emitting diodes 36 are preferably arranged on the front surface 15 of the first plate 14 to define the word STOP and, in a like manner, the second set of light emitting diodes 38 are preferably arranged on the rear surface 17 of the second plate 16 to define the word STOP. Preferably, each letter of the word STOP is defined by three series circuits 46 wherein each series circuit 46 comprises an equal number of light emitting diodes. The plates 14, 16 include a plurality of holes 54 through which the first and second set of light emitting diodes 36, 38 extend. Thus, the first and second set of light emitting diodes 36, 38 extend from the respective circuit board 34 and through the apertures 54.

The safety unit 10, 10' further includes pulsating power circuit means 48 electrically coupled to the array of light emitting diodes 34 for providing a pulsating drive signal to the array 34 to cause the array 34 to be flashed at a visually perceivably flash rate. In other words, the flash rate or flash frequency is below the "flicker-fusion" frequency, i.e., the frequency above which a flashing light appears as a steady light due to the phenomenon of "persistence of human vision". In other words, the human eye can not detect flashing above a certain rate. The flicker fusion frequency is approximately thirty to forty-five flashes per second. Preferably, the flash rate implemented by the pulsating power circuit means 48 is less than thirty flashes per second. By causing the array of light emitting diodes 34 to flash, a highly visible warning to drivers of nearby vehicles or children entering and exiting the school bus is provided. The pulsating power circuit means 48 is preferably mounted to the safety unit 10, 10'. With safety unit 10, pulsating power circuit means 48 is mounted to the display sign means 12 between the first plate 14 and the second plate 16. Pulsating power circuit means 48 is interposed between a power source 49 and the array of light emitting diodes 34 for generating a pulsating drive signal that controls the array of light emitting diodes 34 and causes them to flash, i.e., turn on and off at the visually perceivable flash rate. The power source 49 is located within the school bus 18 and can comprise either the alternator and/or the d.c. battery of the bus. The typical operating voltage of the power source 49 is between twelve and fifteen volts.

Referring to FIG. 5, pulsating power circuit means 48 includes d.c. power connection means 50 for receiving d.c. power from the power source 49 and switch means 52 electrically coupled to the d.c. power connection means 50 and to the array of light emitting diodes 34 for generating the pulsating drive signal. Switch means 52 comprises of a integrated timer circuit 53. Timer circuit 53 is preferably a 755 timer available from National Semi-Conductor Corporation, 2900 Semi-Conductor Drive, Santa Clair, Calif. 95052-8090. The timer circuit 53 has eight pins, P1 through P8. Pins P4 and P8 are connected to each other and to d.c. power connection means 50. Pin P1 is connected to ground. Pins P2 and P6 are connected to a capacitor C1, which is in turn connected to ground. The Farads value of capacitor C1 in conjunction with resistors R1, R2, and R3 controls the frequency of the pulsating drive signal. A resistor R1 and a diode D1 are connected in series and parallel with a resistor R2 and a diode D2 which are also connected in series. In the preferred embodiment, diodes D1 and D2 have the part number IN4148 manufactured by National Semi-Conductor Corporation. A variable resistor R3 is connected to D1, R1, D2 and R2 and to pins P2 and P6 of the integrated circuit timer 53. The anode of diode D1 and the cathode of diode D2 are connected to pin P7 of the timer 53. Variable resistor R3 controls the duty cycle of the pulsating drive signal. Pin P7 is also connected to a resistor R4 which is in turn connected to pins P4 and P8 and d.c. connection means 50. Pin P5 is connected to a capacitor C2. Pin P3 is connected to a resistor R5 which is in turn connected to the gate of a MOS-FET transistor Q1. The source of the transistor Q1 is connected to ground whereas the drain of the transistor Q1 is connected to the array of light emitting diodes 34. Preferably, the transistor Q1 has part number IRLZ14 available from International Rectifier Corp., El Segundo, Calif. The preferred light emitting diode used for array 34 has part number HLMP8103 available from National Semi-Conductor Corporation. Preferably, the values of resistors R1 and R2 are 100 KΩ. Variable resistor R3 is preferably 1 MΩ. Resistors R4 and R5 are 10 KΩ. Capacitor C1 is 1.5 μF which causes the pulsating drive signal to have a one hertz frequency. Capacitor C2 is 0.01 μF. It is to be appreciated that the values set forth can be varied and have been provided for illustrative purposes only.

Safety unit 10, 10' further includes lens/cover means 56 for diffusing the light emitted from the array of light emitting diodes 34 to provide a uniform illumination therefrom and for hermetically sealing the safety unit 10, 10' and the array of light emitting diodes 34. The lens/cover means 56 is transparent to allow light to pass therethrough. The lens/cover means 56 can also be used to hermetically seal the display sign means 12, circuit board means 44, or the pulsating power circuit means 48.

The invention has been described in an illustrative manner, and it is to be understood that the terminology which has been used is intended to be in the nature of words of description rather that of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. In combination with a school bus (18) comprising a passenger compartment having a front end and a rear end, a plurality of seats disposed within said passenger compartment between said front and rear ends, and an aisle extending from said front end to said rear end for allowing a passenger to walk from said front end to said rear end to access said seats, a safety unit (10) comprising:

display sign means (12) for displaying a message, said sign means (12) being mounted on said school bus (18) and movable between a retracted position adjacent to said school bus (18) and an extended position extending outwardly from said school bus (18);

an array of light emitting diodes (34) disposed on said display sign means (12) for providing illumination;

at least one circuit board means (44) mounted to said display sign means (12) for electrically coupling said array of light emitting diodes (34) in a plurality of series circuits (46) and for electrically coupling said series circuits (46) in parallel;

said display sign means (12) including a front surface (15) and a rear surface (17);

said array of light emitting diodes (34) including a first set of light emitting diodes (36) disposed on said front surface (15) for providing illumination in a first direction (40) and a second set of light emitting diodes (38) disposed on said rear surface (17) for providing illumination in a second direction (42) wherein said first and second set of light emitting diodes (36, 38) are arranged on said front and rear surfaces (15, 17) to define the word STOP;

pulsating power circuit means (48) mounted to said display sign means (12) and electrically coupled to said array of light emitting diodes (34) for providing a pulsating drive signal to said array (34) to cause said array (34) to be flashed at a visually perceivable flash rate of less than thirty flashes per second; and said pulsating power circuit means (48) including d.c. power connection means (50) for receiving d.c. power and switch means (52) electrically coupled to said d.c. power connection means (50) and said array of light emitting diodes (34) for generating said pulsating drive signal.

2. The combination of claim 1 further comprising:

actuating means (20) for moving said display sign means (12) between said retracted and extended positions; wherein said actuating means (20) comprises a housing (22) fixedly mounted to said school bus (18), bracket means (24) for pivotably mounting said display sign means (12) to said housing (22) for movement about a predetermined pivot axis (26), and drive means (28) for pivoting said bracket means (24) about said pivot axis (26) between said retracted and said extended positions.

3. The combination of claim 1 further comprising lens means (56) for diffusing the light emitted from said array of light emitting diodes (34) to provide uniform illumination.

4. The combination of claim 1 further comprising cover means (56) for hermetically sealing said display sign means (12), said pulsating power circuit means (48) and said array of light emitting diodes (34).

5. An illuminated display sign (10) for a school bus (18) of the type comprising a passenger compartment having a front end and a rear end, a plurality of seats disposed within the passenger compartment between the front and rear ends, and an aisle extending from the front end to the rear end for allowing a passenger to walk from the front end to the rear end to access the seats, said display sign (12) comprising:

display sign means (12) adapted to be mounted to the school bus (18) for displaying a message, said display sign means (12) having a front surface (15) and a rear surface (17);

an array of light emitting diodes (34) disposed on said display sign means (12) for providing illumination, said array (34) comprising a first set of light emitting diodes (36) disposed on said front surface (15) for providing illumination in a first direction (40) and a second set of light emitting diodes (38) disposed on said rear surface (17) for providing illumination in a second direction (42); and pulsating power circuit means (48) electrically coupled to said array of light emitting diodes (34) for providing a pulsating drive signal to said array (34) to cause said array (34) to be flashed at a visually perceivable flash rate; and said first and second sets of light emitting diodes (36, 38) are arranged on said front and rear surfaces (15, 17) to define the word STOP.

6. An illuminated display sign (10) for a school bus (18) of the type comprising a passenger compartment having a front end and a rear end, a plurality of seats disposed within the passenger compartment between the front and rear ends, and an aisle extending from the front end to the rear end for allowing a passenger to walk from the front end to the rear end to access the seats, said display sign (10) comprising:

display sign means (12) adapted to be mounted to the school bus (18) for displaying a message, said display sign means (12) comprising a front surface (15) and a rear surface (17);

an array of light emitting diodes (34) disposed on said display sign means (12) for providing illumination, said array (34) comprising a first set of light emitting diodes (36) disposed on said front surface (15) for providing illumination in a first direction (40) and a second set of light emitting diodes (38) disposed on said rear surface (17) for providing illumination in a second direction (42), said first and second sets of light emitting diodes (36, 38) being electrically connected in a plurality of series circuits (46) wherein said series circuits (46) are electrically connected in parallel;

said first and second sets of light emitting diodes (36, 38) being arranged on said front and rear surfaces (15, 17) to define the word STOP; and pulsating power circuit means (48) mounted to said display sign means (12) and electrically coupled to said array of light emitting diodes (34) for providing a pulsating drive signal to said array (34) to cause said array to be flashed at a flash rate of less than thirty flashes per second, said pulsating power circuit means (48) including d.c. power connection means (50) for receiving d.c. power and switch means (52) electrically coupled to said d.c. power connection means (50) and said array of light emitting diodes (34) for generating said pulsating drive signal.

* * * * *